July 7, 1964 J. S. WINSLOW 3,140,435
CAPSTAN MOTOR DAMPING SERVO
Filed Oct. 24, 1960
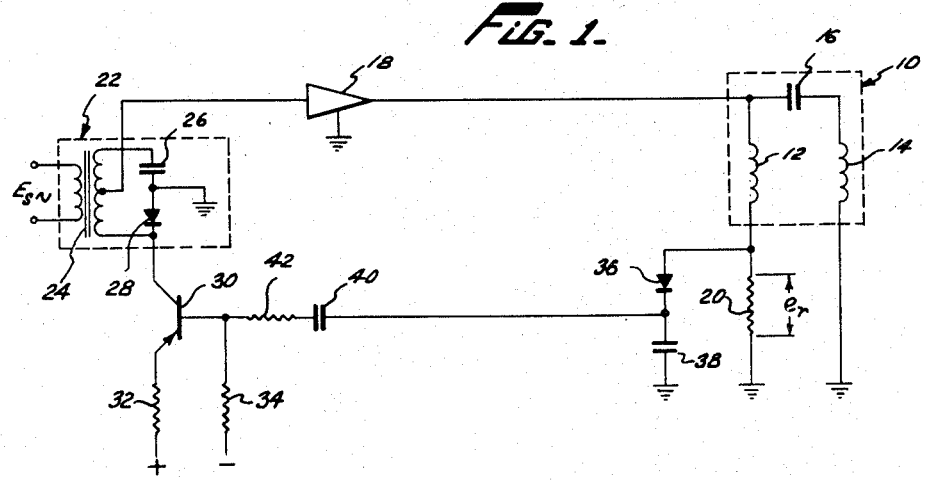
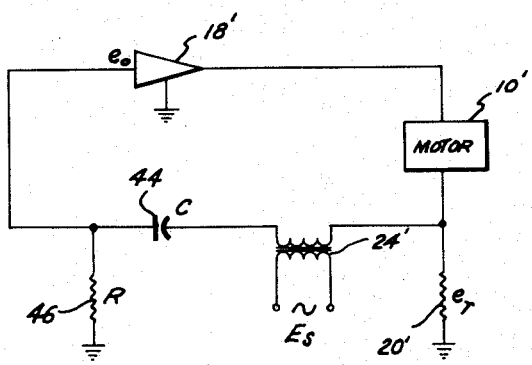
INVENTOR.
JOHN S. WINSLOW
BY
Christie, Parker & Hale
ATTORNEYS 3,140,435
CAPSTAN MOTOR DAMPING SERVO
John S. Winslow, Altadena, Calif., assignor to Consolidated Electrodynamics Corporation, Pasadena, Calif., a corporation of California
Filed Oct. 24, 1960, Ser. No. 64,563
5 Claims. (Cl. 318—175)

This application relates to a constant speed motor drive and, more particularly, is concerned with a damping servo for a hysteresis type synchronous motor.

Phonograph turntables and magnetic tape capstans frequently are driven by hysteresis type synchronous motors to provide a substantially constant speed drive. Such drives exhibit a highly underdamped mechanical resonance due to the characteristic of this type of motor. The natural frequency of this resonance system is determined by the "stiffness" of the motor and the moment of inertia of the rotating system. Random changes in the load, such as variations in tape tension, or changes in the motor supply voltage, cause the drive to "hunt" at its resonance frequency. This hunting shows up directly as flutter. If variations in tape tension, for example, occur periodically at a frequency near the resonance frequency of the tape drive, large oscillations and correspondingly large flutter effects will result.

The present invention is directed to a motor drive circuit which includes a servo loop for effecting a damping of any flutter produced by sudden changes in the motor load or changes in the supply voltage.

The damping servo of the present invention is arranged to damp out flutter by sensing any variations in the angle between the rotor and the rotating field of the motor. Any changes in load on the motor immediately are reflected as changes in this angle. Changes in this angle are used in the servo loop to vary the phase of the voltage applied across the field of the motor in such a way as to damp out the motor flutter.

This is accomplished, in brief, by deriving a voltage across a small resistor in series with the motor. This voltage is a measure of the angle between the rotor and the rotating field of the motor. This voltage is used to vary the phase of an input signal applied to a power amplifier, the output of the power amplifier being used to drive the motor.

For a more complete understanding of the invention, reference should be had to the accompanying drawing, wherein:

FIGURE 1 is a schematic block diagram of one embodiment of the present invention; and FIGURE 2 is a schematic block diagram of an alternative embodiment of the present invention.

Referring to FIGURE 1 in detail, the numeral 10 indicates generally a split phase hysteresis type synchronous motor having a pair of rotor windings indicated at 12 and 14, and a phase splitting capacitor 16. The motor 10 is driven from the output of a power amplifier 18. A resistor 20 is connected in series with the motor, the resistor being of low value resistance across which is derived a reference voltage $e_r$. The input signal to the power amplifier 18 is derived from an A.C. source (not shown) providing a voltage $E_s$ through a variable phase shift network, indicated generally at 22. The variable phase shift network 22 is conventional in that it includes an input transformer 24 having a center tap secondary winding. A capacitor 26 and a variable resistor in the form of a back-biased diode 28 are connected across the secondary of the transformer 24. The input to the power amplifier 18 is connected between the center tap of the secondary and the junction between the capacitor and the diode 28.

A back bias is applied to the diode 28 by means of a transistor 30 of the PNP type having the emitter connected to a positive potential source through a resistor 32. The diode 28 is connected in series with the collector electrode in a direction to oppose the normal flow of current through the transistor. The base of the transistor is connected to a negative bias source through a resistor 34. The transistor 30 is arranged to maintain a back bias on the diode 28 in the operating region in which the resistance of the diode varies most rapidly with changes in the amount of back voltage across the diode.

In a synchronous type A.C. motor, the rotor turns in synchronism with a rotating magnetic field. Any change in load on the motor, changes the phase angle between the rotating field and the induced field of the rotor, but the rotor continues to rotate at the synchronous speed. When the load on the motor abruptly changes, the rotor, in seeking its new relative phase angle in relation to the rotating magnetic field of the motor, overshoots the new phase angle and goes into a damped oscillation.

The present invention provides a means of momentarily changing the phase of the field in a direction to limit the overshoot of the rotor and thus provide an increased damping effect on the rotor. This is accomplished in the circuit of FIGURE 1 by means of a feedback arrangement in which the phase shift network 22 is controlled in response to changes in the voltage $e_r$. It can be shown that the voltage $e_r$ is a function of the difference in phase angles between the rotating magnetic field and the rotor of the synchronous motor 10. A sudden increase in load, which increases the angle between the field and the rotor, also increases the voltage $e_r$ appearing across the series resistor 20. This voltage is rectified and filtered by means of a diode 36 and filter capacitor 38 connected in series across the resistor 20. The rectified voltage is differentiated by means of a differentiating network including a capacitor 40 and a resistor 42 and applied to the base electrode of the transistor 20.

As a result of the feedback operation, any sudden change in load produces a momentary shift in the phase of the output voltage derived from the power amplifier 18 as applied to the motor 10. The momentary shift in phase is in a direction to compensate for the effect of changes between the angle of the field and the angle of the rotor due to a sudden load change, for example, and thereby to prevent hunting. The circuit, as described, is effective in increasing the damping ratio from .1 to about .5, where the damping ratio is defined as the ratio of the actual damping to the critical damping of the servo. A damping ratio of unity corresponds to a critically damped system.

While the circuit of FIGURE 1 is effective in demonstrating the principles of the present invention, the circuit can be simplified in the manner shown in FIGURE 2. In this arrangement, the synchronous motor 10' is driven from the power amplifier 18' in the same manner as described in FIGURE 1. The reference voltage $e_r$ derived across the series resistor 20' is added to the source voltage $E_s$ across the secondary of the transformer 24', and applied to the input of the power amplifier 18' through a differentiating or lead network including a capacitor 44 and a resistor 46. The network preferably is designed to provide a 45° phase lead at the operating frequency. It can be shown that the reference voltage and the source voltage are not in phase and, therefore, the phase angle of the input signal to the power amplifier 18' varies with changes in the reference voltage produced by any change of load on the motor 10'. This change of phase as applied to the input of the motor 10' has the same damping effect as described in connection with FIGURE 1. The lead network provides a proper phase shift around the loop under normal operating conditions.

Both the circuit of FIGURE 1 and the circuit of FIG-

URE 2 are effective in materially improving the damping characteristic of a synchronous motor. This is particularly important in magnetic tape drive systems where transient oscillations distort the recorded signal.

What is claimed is:

1. A motor drive circuit comprising a synchronous motor, a source of alternating voltage, means including a small resistor in series with the motor for deriving a reference signal from the motor that varies with changes in the angle between the rotor and the rotating field of the motor, a power amplifier, means for coupling the source of the alternating voltage to the amplifier input, the motor being coupled to the output of the amplifier, and means responsive to the reference signal for changing the phase angle of the amplifier input with variation in said reference signal, whereby flutter causing changes in the angle between the rotor and the field of the motor is damped by the changes in angle of the field.

2. A motor drive circuit comprising a synchronous motor, a source of alternating voltage, means for deriving a reference signal from the motor that varies with changes in the angle between the rotor and the rotating field of the motor, a power amplifier, means for coupling the source of alternating voltage to the amplifier input, the motor being coupled to the output of the amplifier, and means responsive to the reference signal for changing the phase angle of the amplifier input with variation in said reference signal including means for adding the alternating voltage of said reference signal, the added voltages being applied to the input of the amplifier, whereby flutter causing changes in the angle between the rotor and the field of the motor is damped by the changes in the angle of the field.

3. Apparatus as defined in claim 2 further including means providing a predetermined phase lead coupling the added voltages to the amplifier input.

4. A motor drive circuit comprising a synchronous motor, a source of alternating voltage, means for sampling current flow through the motor to derive a reference voltage signal which varies with changes in the angle between the rotor and rotating field of the motor, a power amplifier, means for coupling the source of alternating voltage to the amplifier input, the motor being coupled to the output of the amplifier, and means responsive to the reference voltage signal for changing the phase angle of the amplifier input with variation in the reference voltage signal, whereby flutter causing changes in the angle between the rotor and the field of the motor is damped by the changes in the angle of the field.

5. In a stabilizing system for a synchronous motor having a rotor, a stator and polyphase stator windings to produce a rotating field coupled to said rotor, power-line conductors connected to said stator windings, phase-shifting means in at least one of said conductors and current-responsive means connected to one of said conductors for controlling said phase-shifting means to minimize hunting of said rotor.

References Cited in the file of this patent

UNITED STATES PATENTS

| | | |
|---|---|---|
| 2,415,405 | Barney | Feb. 11, 1947 |
| 2,640,179 | Alexanderson et al. | May 26, 1953 |
| 2,803,792 | Turner | Aug. 20, 1957 |